(12) United States Patent
Thirugnanam et al.

(10) Patent No.: US 8,226,305 B2
(45) Date of Patent: Jul. 24, 2012

(54) FIBER OPTIC TRANSCEIVER MODULE RELEASE MECHANISM

(75) Inventors: Raja Maruthu Thirugnanam, Fremont, CA (US); Gioni Bianchini, Sunnyvale, CA (US); Rob Golden, Discovery Bay, CA (US)

(73) Assignee: Fourte Design & Development, LLC., Sunol, CA (US)

( * ) Notice: Subject to any disclaimer, the term of this patent is extended or adjusted under 35 U.S.C. 154(b) by 0 days.

(21) Appl. No.: 13/287,536

(22) Filed: Nov. 2, 2011

(65) Prior Publication Data

US 2012/0106903 A1 May 3, 2012

Related U.S. Application Data

(63) Continuation-in-part of application No. 12/917,857, filed on Nov. 2, 2010.

(51) Int. Cl.
*G02B 6/36* (2006.01)
*H04B 10/00* (2006.01)

(52) U.S. Cl. ............... 385/92; 385/53; 385/54; 385/55; 385/56; 385/57; 385/58; 385/59; 385/88; 385/89; 385/90; 385/91; 385/93; 385/94; 398/135; 398/136; 398/137; 398/138; 398/139

(58) Field of Classification Search ............. 385/53–59, 385/88–94; 398/135–139
See application file for complete search history.

(56) References Cited

U.S. PATENT DOCUMENTS

| | | | |
|---|---|---|---|
| 6,746,158 B2 | 6/2004 | Merrick | |
| 6,789,958 B2 * | 9/2004 | Ahrens et al. | 385/92 |
| 6,872,010 B1 * | 3/2005 | Bianchini | 385/92 |
| 7,513,693 B2 * | 4/2009 | Wang | 385/56 |
| 7,699,536 B2 * | 4/2010 | Yoshikawa et al. | 385/92 |
| 7,841,779 B1 * | 11/2010 | Bianchini et al. | 385/88 |
| 2003/0108300 A1 | 6/2003 | Walker et al. | |
| 2004/0033027 A1 | 2/2004 | Pang et al. | |
| 2007/0189673 A1 * | 8/2007 | Yoshikawa | 385/53 |

* cited by examiner

*Primary Examiner* — Brian M. Healy
*Assistant Examiner* — Guy Anderson
(74) *Attorney, Agent, or Firm* — Thomas, Kayden, Horstemeyer & Risley, LLP

(57) ABSTRACT

A fiber optic connector release mechanism for releasing a transceiver module in a cage permanently mounted on a PCB is disclosed. The release mechanism includes a bail rotating a U-shaped flange through a two stage travel path to urge the bail forward in a slide path on the transceiver module. The release mechanism includes a boss disposed on one of the bail and the arm assembly and a dimple disposed on another of the bail and the arm assembly to secure the bail in a locked position. As the bail moves forward from the locked position, wedge elements at the end of arms extending rearward may contact locking tabs on the cage, forcing the locking tabs outward. As the locking tabs are forced outward, the shoulders of the transceiver module are released, and the transceiver module is free to slide out of the cage.

17 Claims, 6 Drawing Sheets

FIBER OPTIC TRANSCEIVER MODULE RELEASE MECHANISM

This application is a continuation-in-part of co-pending U.S. utility application, having Ser. No. 12/917,857, filed Nov. 2, 2010 which is incorporated by reference herein in its entirety.

BACKGROUND OF THE INVENTION

1. Field of the Invention

This present invention relates generally to electronic connector devices. More particular, the present invention is a fiber optic transceiver release mechanism.

2. Description of the Prior Art

Computers and related peripheral equipment, as well as satellite and communication systems, have in the recent past evolved extremely rapidly. These systems require ever increasing data transfer rates to perform the highly complex task that drive the systems, such as digital signal processing, image analysis, and communications. With current demands, optical couplers are used to transfer signals over short and long distances between computers, between two circuit boards in one computer, and even between multiple chips on a single printed circuit board. The use of high speed optical signals in place of electrical interconnections increases the achievable data transfer rate.

An optical transmitter/receiver (transceiver) module typically includes both light emitting devices such as vertical cavity surface emitting lasers (VCSEL's) and light detecting device such as photodiodes. Driver/receiver circuitry modules, typically in the form of application specific integrated circuit (ASIC) chips, include driver circuitry for receiving signals from one device and drive the VCSEL's in response. The ASIC also includes receiver circuitry for receiving signals from the photodiodes and, in response, for processing those signals into an appropriate output. The combination of the VCSEL's, the photodiodes, and the ASIC circuitry is commonly referred to as an optical transceiver or a fiber optic transceiver.

As the density of the optical arrays increases, coupling a fiber optic cable to the arrays becomes an increasingly complex task. It is very important to align the active area of each emitter and detector with a corresponding fiber of the fiber optic bundle. The mechanical connection means therefore undergo a corresponding increase in importance. Fiber optic connectors are therefore of great interest in the current art. As such, improvements in the reliability and ease of manufacturing of such connectors are always welcome.

In the applications which are of interest in the present invention, local connector (LC) plugs are received in a pair of bays in a fiber optic transceiver module housed in a cage that is permanently mounted to a printed circuit board (PCB). It is imperative for data transmission or receiving. If the user wants to remove the transceiver module from the cage, it is equally important that the user be able to know whether or not the LC plugs are in use.

SUMMARY OF THE INVENTION

Exemplary embodiments of the present invention disclose a release mechanism for a transceiver module. The mechanism may include a bail rotatably module on the transceiver module. The bail may include a U-shape flange that partially surrounds an arm assembly so that the bail does not tend to separate from the arm assembly or from the transceiver module. The arm assembly may have a main body nested in the bail, and may further include a pair of arms that extend rearward. The arm assembly may include wedge elements at distal ends thereof, and the wedge elements may include an angled or arced surface. A locking configuration includes a boss disposed on one of the bail and the arm assembly, and includes a dimple disposed on another of the bail and the arm assembly. The dimple is corresponding to the boss for receiving the boss so as to secure the bail in a locked position.

The transceiver module may be constructed to be received in a cage adapted to be affixed to a printed circuit board. The cage may include locking tabs in opposing side panels that fit into openings of the transceiver module to secure the module in the cage.

To release the transceiver from the module, the bail may move in a two-stage travel path. First the bail may rotate from the locked position through an approximately 45 degree arc without moving the transceiver module from an installed position as an axis pin moves in a slot in the arm assembly and the U-shaped flange moves through a first stage of an eccentric cam slot. It should be noted that the bail may not be able to complete its rotation unless plug bays of the transceiver module are not occupied by plugs.

Other embodiments of the invention include methods of releasably securing a transceiver module in a cage. Such methods may include the following steps: forming a cage with locking tabs in opposing side thereof, forming a transceiver module with openings therein to receive the locking tabs when the transceiver module is inserted into the cage, providing an arm assembly with a pair of arm extending rearward, a main body of the arm assembly being nested in a bail, forming a boss disposed on one of the bail and the arm assembly and a dimple disposed on another of the bail and the arm assembly, the dimple being corresponding to the boss for receiving the boss so as to secure the bail in a locked position, rotatably mounting the bail on a front end of the transceiver module, the bail including a U-shaped flange that at least partially encloses inner and outer surfaces of the arm assembly, rotating the bail through an initial arc to release the bail from a locked position, and further rotating the bail to release the locking tabs form the openings.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
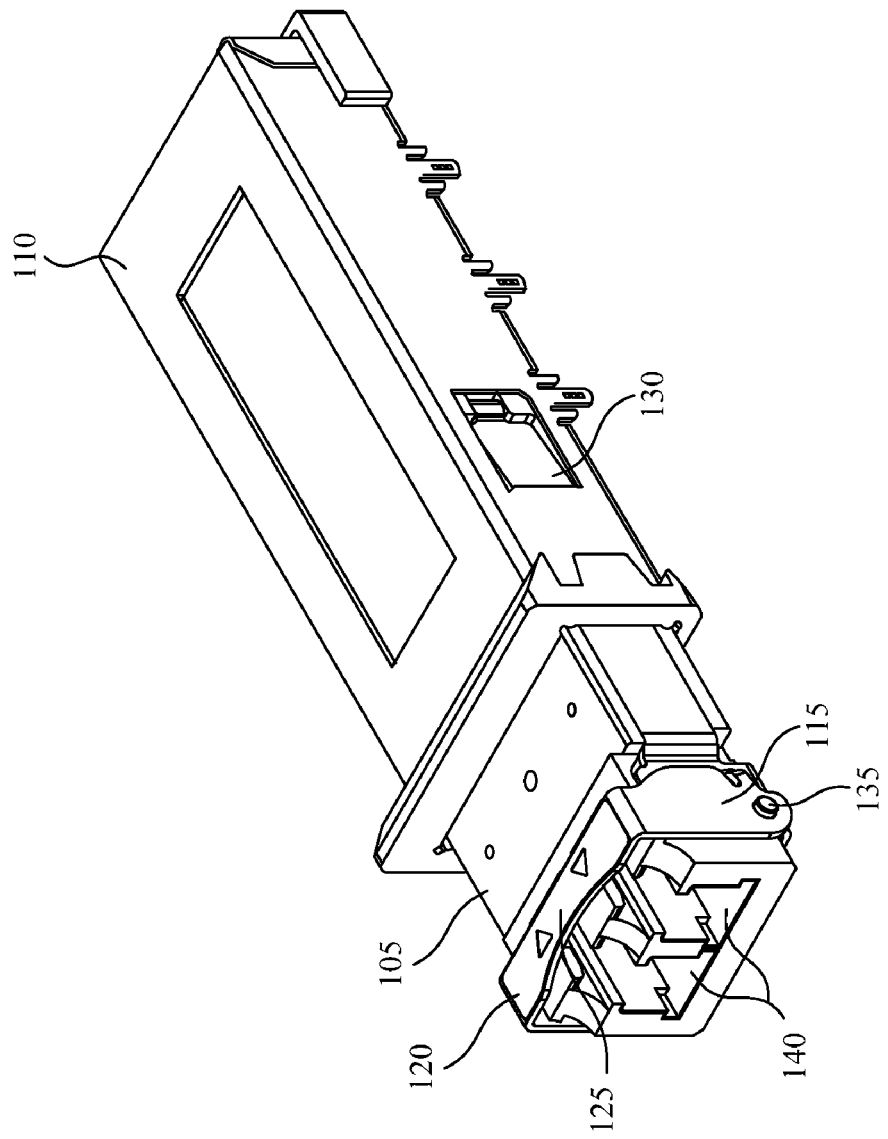
FIG. 1 is a perspective view of a transceiver module with a release mechanism according to an embodiment of the present invention, the transceiver module installed in a cage.

Exemplary embodiments of the present invention disclose a fiber optic transceiver release mechanism as illustrated in FIGS. 1-6. The release mechanism may be used on a transceiver module 105 that may be received in a cage 110 that is typically permanently mounted on a printed circuit board (not shown). The release mechanism may include a bail 115 with a handle 120. The handle 120 of the bail 115 may include a conveniently shaped finger plate 125 to provide a means for a user to easily grasp the handle 120.

The transceiver module 105 may be held in place in the cage 110 by a pair of locking tabs 130 formed as part of the side panels of the cage 110. The locking tabs 130 may protrude inward so as to contact the transceiver module 105 when the transceiver module 105 is inserted into the cage 110. The locking tabs 130 may be received in openings 205 defined in opposing sides of a transceiver module housing 210 when the transceiver module 105 is fully inserted into the cage 110.

As the transceiver module 105 is inserted into the cage 110, a flat segment 215 of the transceiver module housing 210 contacts the locking tabs 130, pushing the locking tabs 130 outward so that the transceiver module 105 can slide into the cage 110. When the transceiver module 105 is in the proper position in the cage 110, the locking tabs 130 rebound into the openings 135 on each side of the module housing 210. The transceiver module 105 therefore cannot be removed from the cage 110 until the locking tabs 130 are released.

Figure 5:
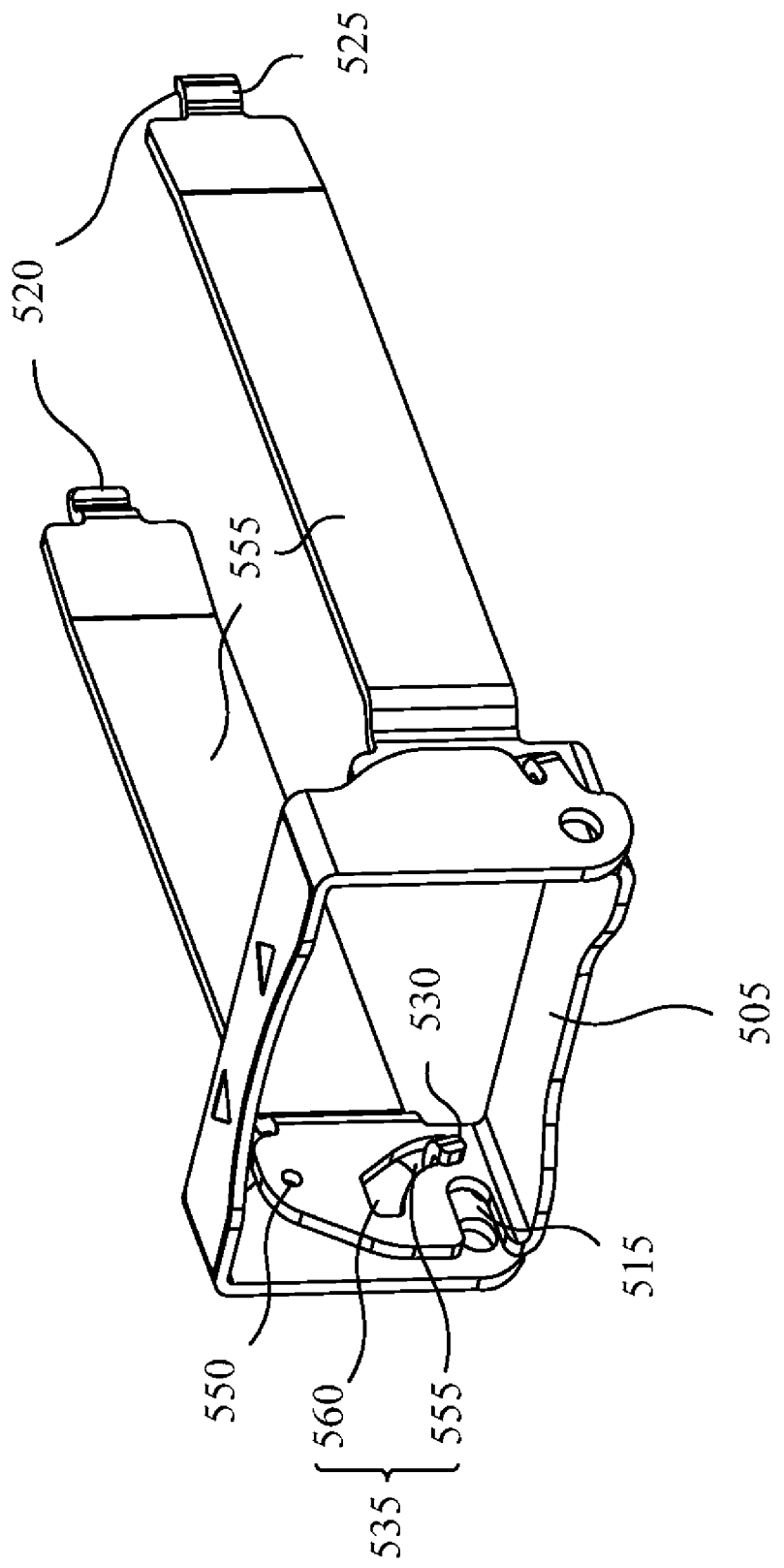
FIG. 5 is a perspective view of the bail and arm assembly.

FIG. 5 illustrates an embodiment of the structure of the bail 115 and an arm assembly 505. The bail 115 may be mounted on the module housing 210 with the arm assembly 505, which includes a pair of extended arms 510. The bail 115 may be rotatably attached to the transceiver module housing 210 with an axis pin 135 (see FIGS. 1 and 2) that passes through a slot 515 in the arm assembly 505.

At the rear ends of the arms 510 are wedge elements 520 that may each include an angled or arced surface 525. The angled or arced surface 525 allows the wedge elements 520 to move the locking tabs 130 from a locked position and out of the path of the transceiver module 105 in the cage 110 when the release mechanism is actuated. The wedge elements 520 and the arms 510 may at least partially define the openings 135 in the transceiver module 105.

The bail 115 may include a U-shaped flange 530 received in an eccentric cam slot 535 in the arm assembly 505. The U-shaped flange 530 may wrap around the arm assembly 505 (through the cam slot 535) so that the flange 530 contacts both inner and outer surfaces of the arm assembly 505. The U-shaped configuration of the flange 530, by enclosing the arm assembly 505, inhibits separation of the bail 115 from the arm assembly 505 and the transceiver module 105.

Figure 2:
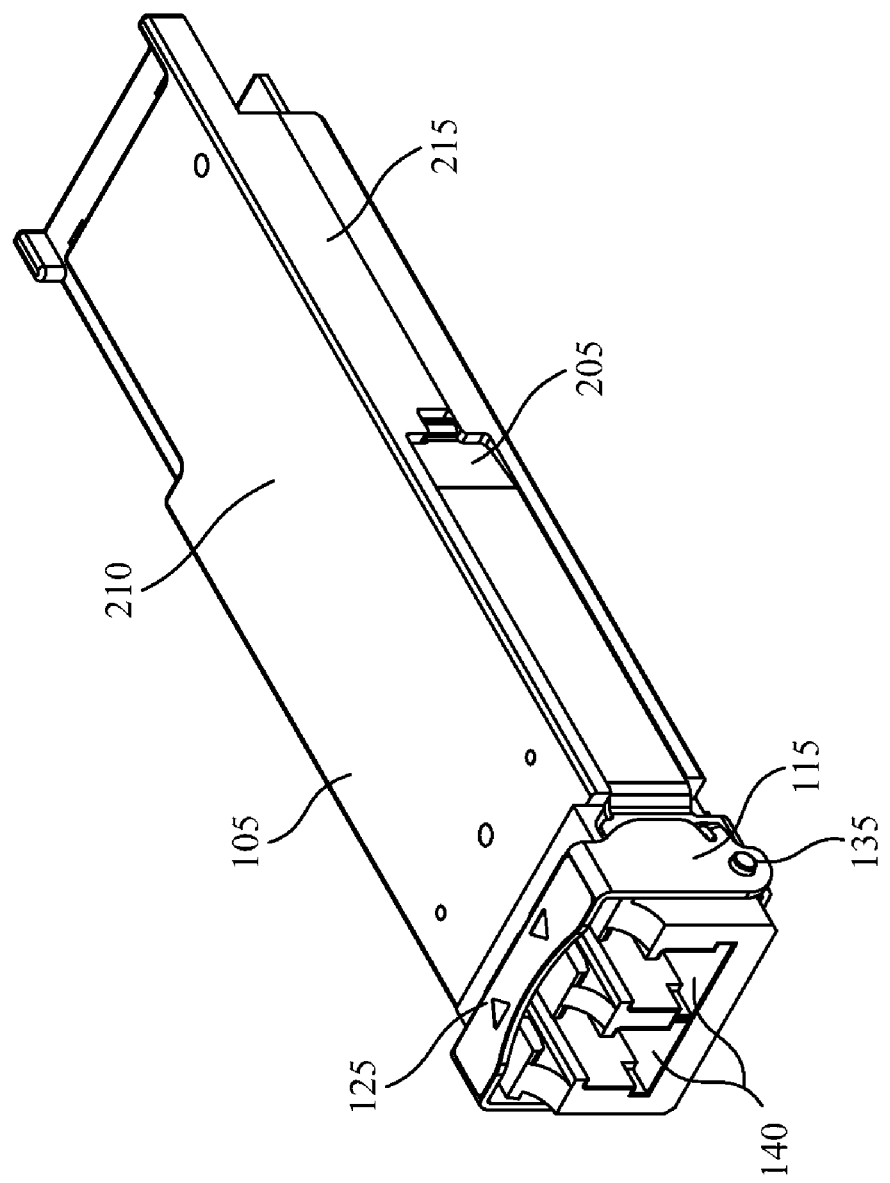
FIG. 2 is a perspective view of the transceiver module moved from the cage, and with the bail in its locked position.
Figure 3:
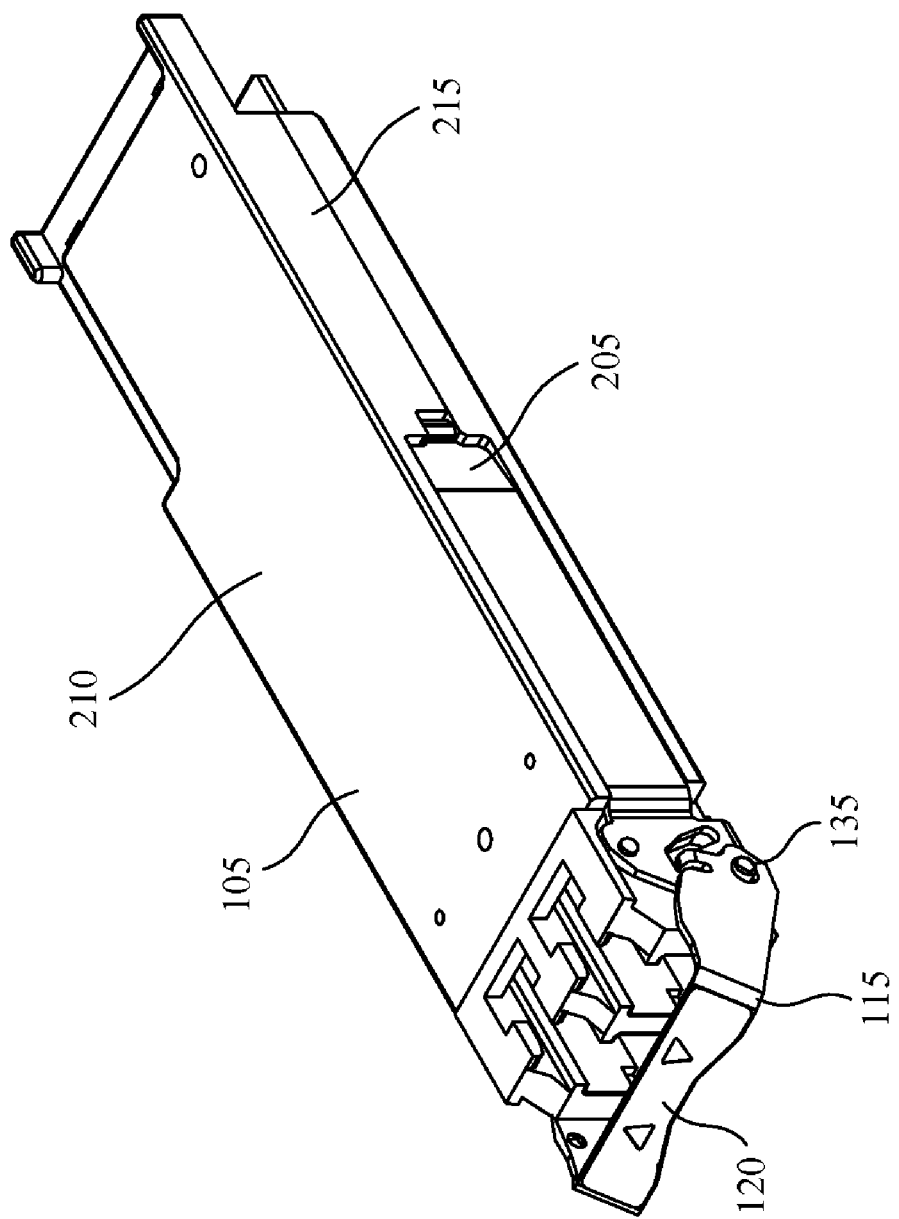
FIG. 3 is a perspective view of the transceiver module with the bail in its released position.
Figure 4:
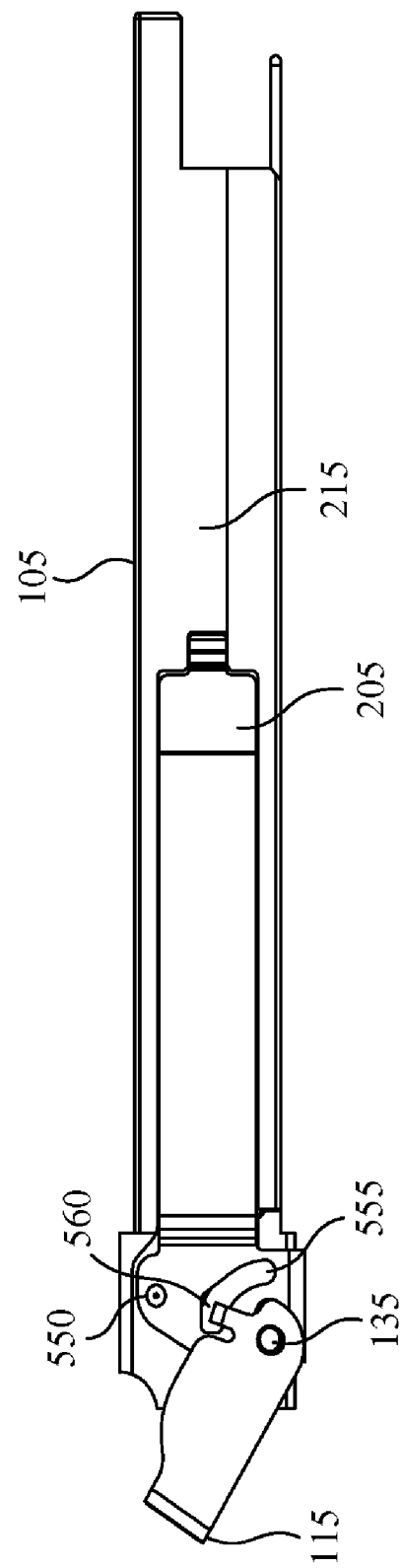
FIG. 4 is a side view of the transceiver module with the bail in its released position.
Figure 6:
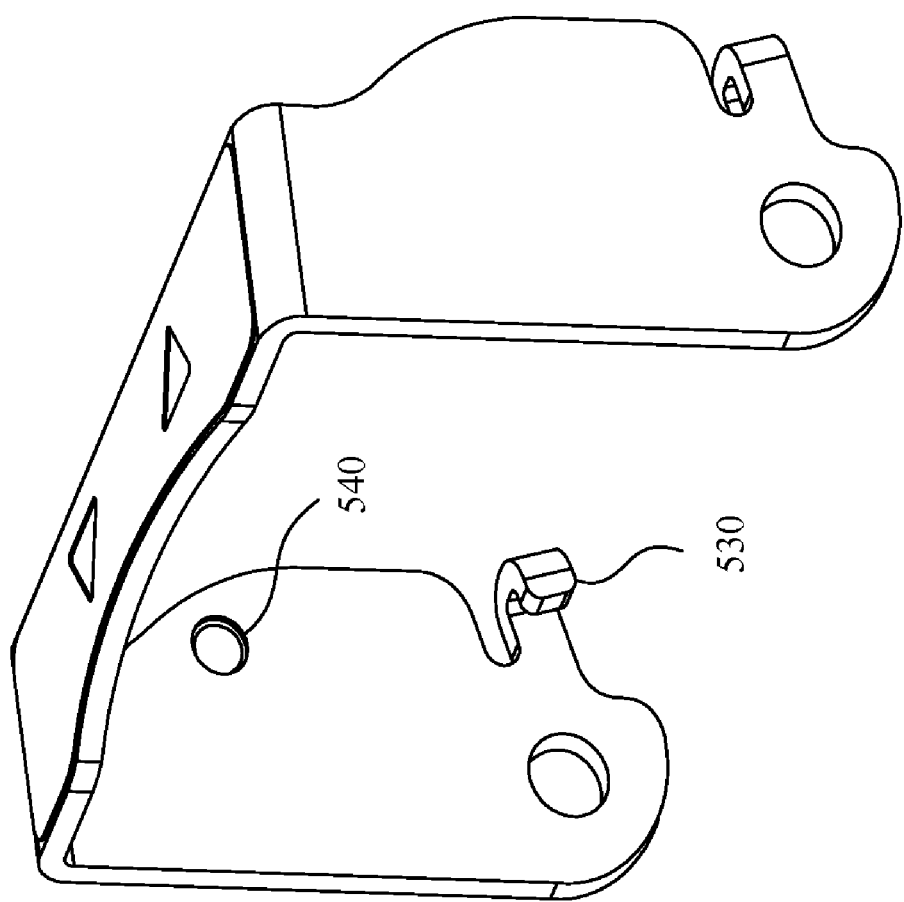
FIG. 6 is a perspective view of the bail.

The bail 115 may includes dimples 540 on the sidewalls toward the transceiver module housing 210, as shown in FIG. 6. Bosses 550 protruding from the arm assembly 505 may be received in dimples 540 to secure the bail 115 in a locked position as illustrated in FIGS. 1 and 2. In the locked position, the bosses 550 and the dimples 540 are hidden by the bail 115.

In another embodiment, the dimples may be formed on the arm assembly and the bosses may protrude from the bail, where the bosses on the bail may be received in the dimples on the arm assembly to secure the bail in a locked position.

The bail 115 has a two-stage travel path during the release process. To initiate the release, a user uses the handle 120 to rotate the bail 115. As the bail 115 is rotated forward, the dimples 540 of the bail 115 are moved from the bosses 550 to release the bail 115 from its locked position. Flange 530 moves through a first stage 555 of the cam slot 535 as the bail rotates through an arc of approximately 45 degrees.

As the bail 115 rotates past 45 degrees, the flange 530 moves into a second stage 560 of the cam slot 535. The flange 530 then contacts a front edge of the second stage 560 of the cam slot 535 to pull the arm assembly 505 forward. As the arms 510 move forward with the arm assembly 505, the angled or arced surfaces 525 of the wedge element 520 press against the locking tabs 130 of the cage 110. The forward motion of the wedge elements 520 urges the locking tabs 130 out of the interior of the cage 12. The arm assembly 505 may move forward until the rear edge of slot 515 contacts the axis pin 135. At this point, the arms 510 have been moved forward enough so that the angled or arced surface 525 of the wedge element 520 have moved the locking tabs 130 clear of the interior of the transceiver module 105. The transceiver module 105 is therefore free to slide out of the cage 110 as the operator continues to pull on the bail 115. The bail 115 is now in the release position shown in FIGS. 3 and 4.

It should be noted that the bail 115 cannot complete the necessary rotation to release the transceiver module 105 unless any installed LC plugs (not shown) have been removed from plug bays 140 of the transceiver module 105. This feature provides a failsafe method for assuring that the transceiver module 105 cannot be removed from the cage 115 while the LC plugs are in position, thereby avoiding inadvertent data transmission interruption.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A release mechanism for a transceiver module, the release mechanism comprising:
   a bail rotatably mounted on the transceiver module, the bail including a U-shaped flange;
   an arm assembly nested in the bail, the arm assembly including a pair of arms that extend rearward;
   a locking configuration including a boss disposed on one of the bail and the arm assembly and a dimple disposed on another of the bail and the arm assembly, the dimple being corresponding to the boss for receiving the boss so as to secure the bail in a locked position; and
   a cage to receive the transceiver module, the cage including locking tabs in opposing side panels thereof, the cage being adapted to be mounted on a printed circuit board;
   wherein the bail is totatably mounted on the transceiver module by an axis that passes through a slot in the arm assembly, the U-shaped flange surrounds both an inner surface and an outer surface of the arm assembly, and the locking arms include elements that receive the locking tabs of the cage.

2. The release mechanism of claim 1, wherein the arms each include at a distal end thereof a wedge element that defines at least a portion of an opening that receives one of the locking tabs therein.

3. The release mechanism of claim 1, wherein the arms each include at a distal end thereof a wedge element that contacts one of the locking tabs and pushes the locking tab outward when the bail is moved forward.

4. The release mechanism of claim 3, wherein the wedge elements each comprise an angled or arced surface.

5. The release mechanism of claim 1, wherein the bail moves in a two-stage travel path, the bail rotating from a locked position through an approximately 45 degree arc without moving the transceiver module from an installed position as the axis pin moves in the slot and the U-shaped flange moves through a first stage of an eccentric cam slot, the bail further rotating to move the U-shaped flange through a second stage of the eccentric cam slot.

6. The release mechanism of claim 1, wherein the transceiver module remains in an installed position as the bail moves from a locked position through an approximately 45 degree arc, and the bail is not able to complete the 45 degree arc unless plug bays of the transceiver module are not occupied by plugs.

7. A release mechanism for a transceiver module, the release mechanism comprising:
   a bail totatably mounted on the transceiver module, the bail including a U-shaped flange;
   an arm assembly nested in the bail, the arm assembly including a pair of arms that extend rearward;
   a locking configuration including a boss disposed on one of the bail and the arm assembly and a dimple disposed on another of the bail and the arm assembly, the dimple being corresponding to the boss for receiving the boss so as to secure the bail in a locked position; and
   a cage that receives the transceiver module, the cage including locking tabs in opposing side panels thereof, the cage being adapted to be mounted on a printed circuit board;
   wherein the bail is rotatably mounted on the transceiver module by an axis that passes through a slot in the arm assembly, the U-shaped flange surrounds both an inner surface and an outer surface of the arm assembly, and the locking arms include at distal ends thereof a wedge element; such that when the release mechanism is in a locked position, the handle is in rearmost position in the slide path, and the at least one locking tab protrudes into the slide path so as to secure the transceiver module, and when the bail is rotated to a released position, the handle moves to a forward position in the slide path, causing the wedge element to push against the at least one locking tab so as to move the at least one locking tab out of the slide path, thereby releasing the transceiver module from the cage.

8. The release mechanism of claim 7, wherein the wedge elements each comprise an angled or arced surface.

9. The release mechanism of claim 7, wherein the bail moves in a two stage travel path, the bail rotating from a locked position through an approximately 45 degree arc without moving the transceiver module from an installed position as the axis pin moves in the slot and the U-shaped flange moves through a first stage of an eccentric cam slot, the bail further rotating to move the U-shaped flange through a second stage of the eccentric cam slot.

10. The release mechanism of claim 7, wherein the transceiver module remains in an installed position as the bail moves from a locked position through an approximately 45 degree arc, and the bail is not able to complete the 45 degree arc unless plug bays of the transceiver module are not occupied by plugs.

11. A method of releasably securing a transceiver module in a cage, the method comprising the following steps:
   forming a cage with locking tabs in opposing sides thereof;
   forming a transceiver module with openings therein to receive the locking tabs when the transceiver module is inserted into the cage;
   providing an arm assembly with a pair of arms extending rearward, a main body of the arm assembly being nested in a bail, and forming a boss disposed on one of the bail and the arm assembly and a dimple disposed on another of the bail and the arm assembly, the dimple being corresponding to the boss for receiving the boss so as to secure the bail in a locked position;
   rotatably mounting the bail on a front end of the transceiver module, the bail including a U-shaped flange that at least partially encloses inner and outer surfaces of the arm assembly;
   rotating the bail through an initial arc to release the bail from the locked position; and
   further rotating the bail to release the locking tabs from the openings.

12. The method of claim 11, wherein providing an arm assembly further includes providing at a distal end of each arm a wedge element that defines at least a portion of an opening that receives one of the locking tabs therein.

13. The method of claim 11, wherein further rotating the bail causes a wedge element at a distal end of each arm to contact one of the locking tabs so that the locking tab is pushed outward, thereby releasing the transceiver module.

14. The method of claim 12, wherein the wedge elements each comprise an angled or arced surface.

15. The method of claim 13, wherein the wedge elements each comprise an angled or arced surface.

16. The method of claim 11, wherein rotating the bail moves the bail from a locked position through an approximately 45 degree arc without moving the transceiver module from an installed position as the axis pin moves in the slot and the U-shaped flange moves through a first stage of an eccentric cam slot, and further rotating the bail further rotating to move the U-shaped flange through a second stage of the eccentric cam slot.

17. The method of claim 11, wherein the bail is not able to complete both rotation steps unless plug bays of the transceiver module are not occupied by plugs.

* * * * *